United States Patent
Jeong

(10) Patent No.: US 7,258,939 B2
(45) Date of Patent: Aug. 21, 2007

(54) COOLING SYSTEM FOR FUEL CELL VEHICLE AND A COOLING PIPE THEREOF

(75) Inventor: Lim Ho Jeong, Yongin (KR)

(73) Assignee: Hyundai Motor Company, Seoul (KR)

( * ) Notice: Subject to any disclaimer, the term of this patent is extended or adjusted under 35 U.S.C. 154(b) by 543 days.

(21) Appl. No.: 10/747,907

(22) Filed: Dec. 29, 2003

(65) Prior Publication Data

US 2005/0056470 A1    Mar. 17, 2005

(30) Foreign Application Priority Data

Sep. 16, 2003    (KR) ...................... 10-2003-0064081

(51) Int. Cl.
*H01M 8/04* (2006.01)
*H01M 8/12* (2006.01)
*H01M 2/00* (2006.01)
*H01M 2/02* (2006.01)
*F28F 1/30* (2006.01)

(52) U.S. Cl. ........................... 429/26; 429/34; 165/182

(58) Field of Classification Search ...................... None
See application file for complete search history.

(56) References Cited

U.S. PATENT DOCUMENTS

| 2,216,778 A | * | 10/1940 | Houdry | 165/182 |
| 2,540,339 A | * | 2/1951 | Kritzer | 165/151 |
| 4,004,947 A | * | 1/1977 | Bloomfield | 429/17 |

FOREIGN PATENT DOCUMENTS

| JP | 62-268062 A | * 11/1987 |
| JP | 2002-216816 | 2/2002 |
| JP | 2003-007323 | 10/2003 |

* cited by examiner

*Primary Examiner*—Patrick Joseph Ryan
*Assistant Examiner*—Julian Mercado
(74) *Attorney, Agent, or Firm*—Morgan Lewis & Bockius LLP

(57) ABSTRACT

An integrated cooling system for a fuel cell vehicle according to this invention comprises a fuel gas flow field for supplying fuel gas to a fuel cell stack and exhausting the fuel gas from the fuel cell stack through a fuel gas accumulator, and an air flow field for supplying air to a fuel cell stack and exhausting the air from the fuel cell stack through an air accumulator, wherein at least one cooling pipe of the cooling system comprises a plurality of heat-dissipation pins on a circumferential surface thereof.

7 Claims, 2 Drawing Sheets

COOLING SYSTEM FOR FUEL CELL VEHICLE AND A COOLING PIPE THEREOF

CROSS-REFERENCE TO RELATED APPLICATIONS

This application claims priority of Korean Application No. 10-2003-0064081, filed Sep. 16, 2003, the disclosure of which is incorporated fully herein by reference.

BACKGROUND OF THE INVENTION

This invention relates to a fuel cell vehicle, and more particularly to a cooling system for a fuel cell vehicle and a cooling pipe thereof. Generally, a fuel cell provided to a fuel cell vehicle generates electric energy utilizing an electrochemical reaction between fuel gas from an anode of a fuel cell stack and air from a cathode of the fuel cell stack.

The fuel cell stack has a Membrane Electrode Assembly (MEA), which has a membrane electrolyte sandwiched between an anode supplied with fuel gas and a cathode supplied with air.

The MEA is sandwiched between a pair of separators. Flow fields, which are defined as a plurality of channels or grooves, are formed on the separators for supplying fuel gas, air, and coolant.

Conventional cooling systems of the fuel cell vehicle, however, generally have two coolant circulation flow fields such that the structure of the cooling system is complicated, making it difficult to make space for mounting the cooling system.

SUMMARY OF THE INVENTION

An exemplary cooling system for a fuel cell vehicle comprises a fuel gas flow field for supplying fuel gas to a fuel cell stack and exhausting unreacted fuel gas from the fuel cell stack through a fuel gas accumulator; an air flow field for supplying air to a fuel cell stack and exhausting unreacted air from the fuel cell stack through an air accumulator; and a coolant circulation flow field for supplying coolant to the fuel cell stack, the fuel accumulator, and the air accumulator with a pressure generated by a pump and cooling the withdrawn coolant therefrom by heat transfer at a radiator.

Preferably, each of a passage of the fuel gas flow field between the fuel cell stack and fuel gas accumulator, a passage of the air flow field between the fuel cell stack and the air accumulator, and a passage of the coolant circulation flow field, is formed with at least one cooling pipe which has a plurality of pins on a circumferential surface thereof.

Preferably, the pins are shaped to be streamlined.

Preferably, the circumferential surface of the pipe for cooling is wave-shaped.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will hereinafter be described in detail with reference to the accompanying drawings.

Figure 1:
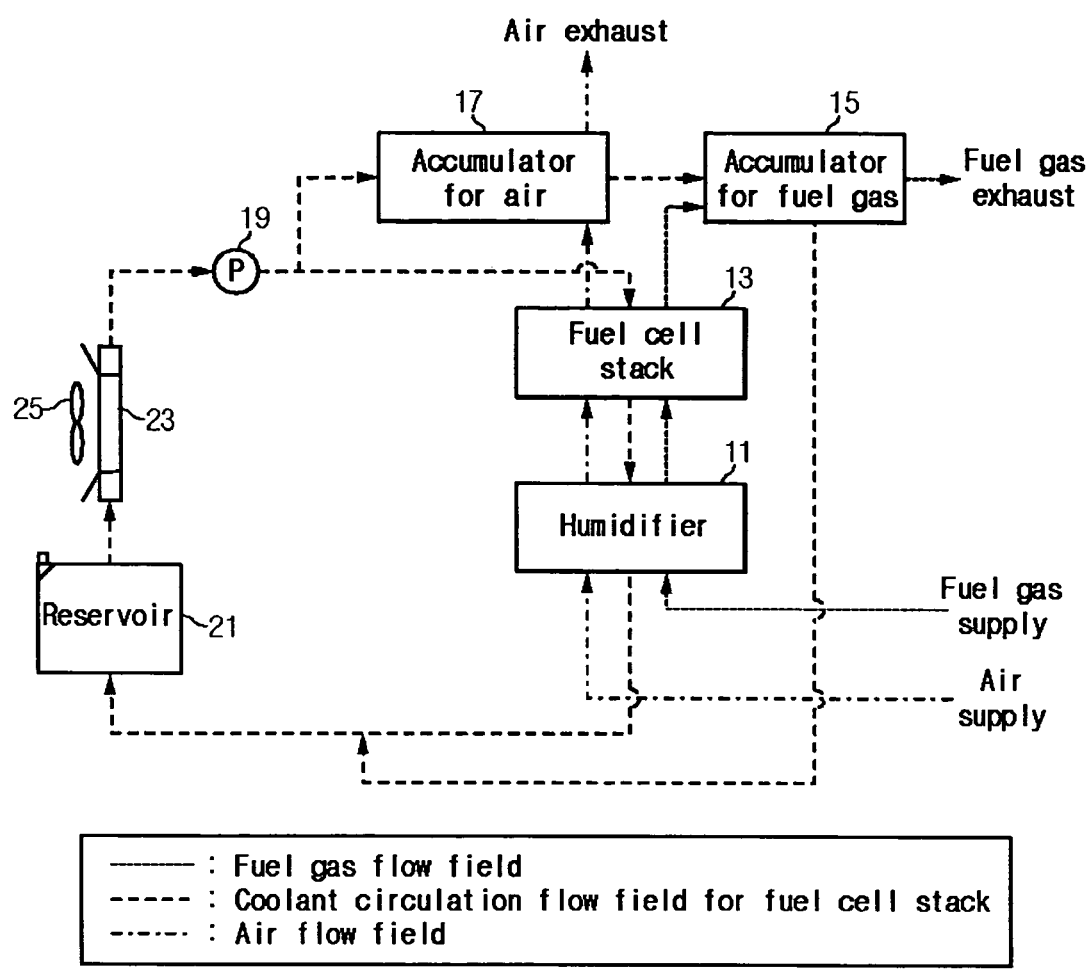
FIG. 1 is a block diagram of a cooling system according to an embodiment of this invention.

FIG. 1 is a block diagram of a cooling system according to an embodiment of this invention.

As shown in FIG. 1, a fuel gas flow field is constituted to connect a humidifier 11, a fuel cell stack 13, and a fuel gas accumulator 15. The humidifier 11 humidifies supplied fuel gas such that fuel gas containing moisture is supplied to the fuel cell stack 13.

A surplus of fuel gas after reaction is exhausted from the fuel cell stack 13 and passes through the fuel gas accumulator 15. In the fuel gas accumulator 15, the moisture contained in the fuel gas is condensed into water.

Meanwhile, the air flow field is constituted to connect the humidifier 11, the fuel cell stack 13, and an air accumulator 17. The humidifier 11 humidifies supplied fuel gas such that air containing moisture is supplied to the fuel cell stack 13.

The surplus of air after reaction is exhausted from the fuel cell stack 13 and passes through the air accumulator 17. In the air accumulator 17, the moisture contained in the air is condensed into water.

The humidifier 11 humidifies the fuel gas and the air flowing to the fuel cell stack 13 such that an MEA (Membrane Electrolyte Assembly) of the fuel cell stack 13 is prevented from deteriorating.

Figure 2:
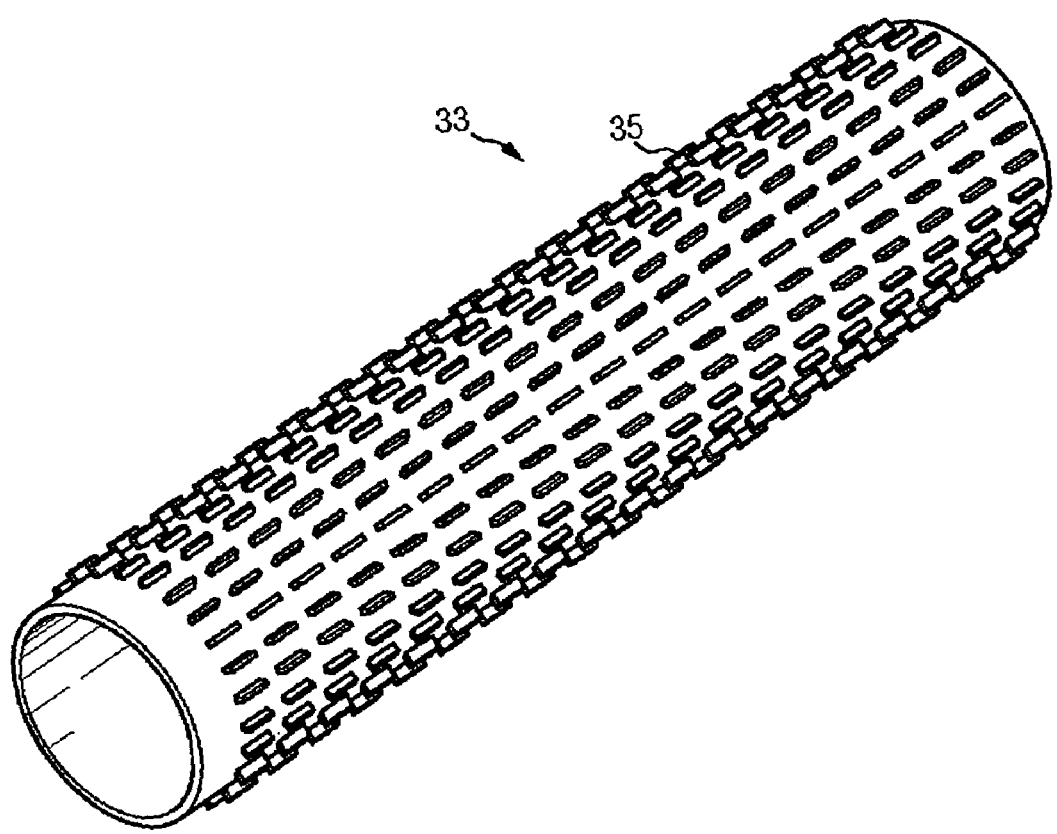
FIG. 2 is a perspective view of a cooling pipe according to an embodiment of this invention.

The fuel gas flow field and the air flow field can be connected to additional components such as a flow meter, a flow controller, a filter, and a valve, which are not shown in FIG. 2.

Furthermore, a coolant circulation flow field is constituted to connect the humidifier 11, the fuel gas accumulator 15, the air accumulator 17, and a radiator 23. A pump 19 is connected to an outlet of the radiator 23 such that the coolant is pressurized by the pump 19 to be supplied to the fuel cell stack 13 and the air accumulator 17.

The coolant passing through the fuel cell stack 13 absorbs heat generated during the reaction between the air and the fuel gas. Subsequently, the coolant from the fuel cell stack 13 is supplied to a humidifier 11 such that the fuel gas and air is humidified utilizing the coolant.

Meanwhile, the coolant from the pump 19 also passes through the air accumulator 17 and the fuel gas accumulator 15 for condensing the moisture contained in the surplus fuel gas and the air from the fuel cell stack 11.

The coolant from the fuel gas accumulator 15 becomes confluent with the coolant from the humidifier 11, and the confluent coolant passes through a reservoir 21 and is supplied to the radiator 23. The coolant passing through the radiator 23 contains heat generated during the reaction in the fuel cell stack and residual heat left over from condensing in the air accumulator 17 and the fuel gas accumulator 15.

The fan 25 supplies air induced from outside of the vehicle such that heat exchange between induced air and the coolant occurs. Accordingly, the coolant which is cooled in the radiator 23, moves again along the coolant circulation flow field.

FIG. 2 is a perspective view of a cooling pipe according to an embodiment of this invention. As shown in FIG. 3, a plurality of fins 35 are formed on a circumferential surface of cooling pipe 33. The pins 35 increase an air contacted area such that heat exchange can be more efficiently operated.

Furthermore, each pin 35 is streamlined such that the air flowing on the circumferential surface can move with decreased interference.

Again with reference to FIG. 1, each of a passage of the fuel gas flow field between the fuel cell stack 13 and fuel gas accumulator 15, a passage of the air flow field between the fuel cell stack 13 and the air accumulator 17, and the whole passage of the coolant circulation flow field preferably includes at least one cooling pipe 33 described in FIG. 2. Accordingly, the unreacted surplus air transferred from the fuel cell stack 13 to the air accumulator 17 and the unreacted surplus fuel gas transferred from the fuel cell stack 13 to the fuel gas accumulator 15 are more efficiently cooled by utilizing the cooling pipe 33. This reduces the temperature of the coolant passing through the accumulators 15, 17.

Furthermore, the passage of the coolant circulation flow field is ducted through with the cooling pipe 33, such that the coolant can be more efficiently cooled.

Accordingly, although only one radiator 23 is sufficient for the integrated cooling system for the accumulator and for the fuel cell stack. Performance of the cooling system is not degraded and the cooling system can be simply constructed with a simple structure.

Furthermore, in order to increase heat exchange, the passages formed with the cooling pipe passages may include a plurality of cooling pipes 33 and the circumferential surface of each cooling pipe 33 can be wave-shaped.

According to the cooling system for a fuel cell vehicle, the cooling system for the accumulator can be integrated with the cooling system for the fuel cell stack without deterioration of cooling performance. Furthermore, the cooling system for the fuel cell vehicle has a small volume.

What is claimed is:

1. A cooling system for a fuel cell vehicle comprising:
   a fuel gas flow field for supplying fuel gas to a fuel cell stack and exhausting the fuel gas from the fuel cell stack through a fuel gas accumulator, wherein a passage of the fuel gas flow field between the fuel cell stack and fuel gas accumulator comprises at least one first cooling pipe which has a plurality of fins on a circumferential surface thereof;
   an air flow field for supplying air to a fuel cell stack and exhausting the air from the fuel cell stack through an air accumulator, wherein a passage of the air flow field between the fuel cell stack and the air accumulator comprises at least one second cooling pipe which has a plurality of fins on a circumferential surface thereof; and
   a coolant circulation flow field for supplying coolant to the fuel cell stack, the fuel accumulator, and the air accumulator having a pressure generated by a pump, and cooling withdrawn coolant therefrom by heat transfer to a radiator, wherein a passage of the coolant circulation flow field consists of at least one third cooling pipe which has a plurality of fins on a circumferential surface thereof.

2. The cooling system of claim 1, wherein the fins are streamlined.

3. The cooling system of claim 2, wherein the circumferential surface of each of the cooling pipe pipes is wave-shaped.

4. The cooling system of claim 1, further comprising exactly one radiator.

5. A plurality of pipes provided to a cooling system for a fuel cell vehicle, comprising:
   at least one first pipe comprising a plurality of fins on a circumferential surface thereof, and housing at least a portion of a fuel gas flow field for supplying fuel gas to a fuel cell stack and exhausting the fuel gas from the fuel cell stack through a fuel gas accumulator;
   at least one second pipe comprising a plurality of fins on a circumferential surface thereof, and housing at least a portion of an air flow field for supplying air to a fuel cell stack and exhausting the air from the fuel cell stack through an air accumulator; and
   at least one third pine comprising a plurality of fins on a circumferential surface thereof, and completely housing a coolant circulation flow field for supplying coolant to the fuel cell stack, the fuel accumulator, and the air accumulator with a pressure generated by a pump, and cooling the coolant withdrawn therefrom by heat transfer to a radiator.

6. The pipes of claim 5, wherein the fins are streamlined.

7. The pipes of claim 6, wherein the circumferential surfaces of the pipes are wave-shaped.

* * * * *